(12) United States Patent
Tsai et al.

(10) Patent No.: US 9,062,845 B1
(45) Date of Patent: Jun. 23, 2015

(54) LED VEHICLE LIGHT

(71) Applicant: Lucidity Enterprise Co., Ltd., Tainan (TW)

(72) Inventors: Hsi-Hsien Tsai, Tainan (TW); Chao-Ming Chang, Tainan (TW)

(73) Assignee: LUCIDITY ENTERPRISE CO., LTD., Tainan (TW)

( * ) Notice: Subject to any disclaimer, the term of this patent is extended or adjusted under 35 U.S.C. 154(b) by 312 days.

(21) Appl. No.: 13/872,869

(22) Filed: Apr. 29, 2013

Related U.S. Application Data

(63) Continuation-in-part of application No. 29/434,355, filed on Oct. 12, 2012, now abandoned.

(51) Int. Cl.
*H05B 37/02* (2006.01)
*F21S 8/10* (2006.01)

(52) U.S. Cl.
CPC .......... *F21S 48/2212* (2013.01); *F21S 48/215* (2013.01); *H05B 37/02* (2013.01); *F21S 48/22* (2013.01)

(58) Field of Classification Search
CPC ... F21S 48/2212; F21S 48/22; F21S 48/2206; F21S 48/2225; F21S 48/2231; F21S 48/2243; F21S 48/225; F21S 48/25; F21S 48/255; F21S 48/215; H05B 37/02
See application file for complete search history.

(56) References Cited

U.S. PATENT DOCUMENTS

| | | | |
|---|---|---|---|
| 4,042,803 A | 8/1977 | Bickford | |
| 4,107,507 A | 8/1978 | Schultz | |
| 4,209,825 A | 6/1980 | Shackelford | |
| 4,221,954 A | 9/1980 | Cohen | |
| 4,279,255 A | 7/1981 | Hoffman | |
| 4,731,706 A | 3/1988 | Ricard | |
| D299,550 S | 1/1989 | Payne | |
| 4,862,519 A | 9/1989 | Bull | |
| 5,148,002 A | 9/1992 | Kuo et al. | |
| D358,674 S | 5/1995 | Ramsey | |
| 5,508,894 A | 4/1996 | Payne et al. | |
| 5,567,035 A | 10/1996 | Dobler et al. | |
| 5,642,933 A | 7/1997 | Hitora | |
| D382,659 S | 8/1997 | Kaloustian | |
| D385,638 S | 10/1997 | Bonnette et al. | |
| D386,805 S | 11/1997 | Bonnette et al. | |
| 5,715,156 A | 2/1998 | Yilmaz et al. | |
| D393,729 S | 4/1998 | Tuttle | |
| D412,370 S | 7/1999 | Cece | |
| D417,027 S | 11/1999 | Cece | |
| D420,302 S | 2/2000 | Barnhart | |
| D424,732 S | 5/2000 | Cece | |
| 6,120,163 A | 9/2000 | Graber et al. | |
| 6,174,078 B1 | 1/2001 | Ohm | |
| 6,329,927 B1 | 12/2001 | Hobson | |
| 6,353,211 B1 | 3/2002 | Chen | |
| 6,533,445 B1 | 3/2003 | Rogers | |
| 6,619,815 B2 | 9/2003 | Southern, Jr. | |
| 6,644,829 B1 | 11/2003 | Tracy et al. | |
| 6,705,749 B1 | 3/2004 | Smith | |
| 6,739,735 B2 | 5/2004 | Talamo et al. | |
| D493,565 S | 7/2004 | Smith et al. | |
| 6,846,094 B2 | 1/2005 | Luk | |
| D505,224 S | 5/2005 | Smith et al. | |

(Continued)

*Primary Examiner* — Jung Kim

(74) *Attorney, Agent, or Firm* — Head, Johnson & Kachigian, P.C.

(57) ABSTRACT

An LED vehicle light assembly providing a ring of diffuse light for taillight functions surrounding an area of non-diffuse light for stop and turn functions.

14 Claims, 6 Drawing Sheets

(56) References Cited

U.S. PATENT DOCUMENTS

| | | |
|---|---|---|
| D507,066 S | 7/2005 | Smith |
| D517,711 S | 3/2006 | Payne et al. |
| 7,114,834 B2 | 10/2006 | Rivas et al. |
| 7,241,019 B1 * | 7/2007 | Tsai et al. .................. 359/520 |
| D551,786 S | 9/2007 | Smith |
| D565,235 S | 3/2008 | Smith |
| D585,516 S | 1/2009 | Smith |
| D646,826 S | 10/2011 | Smith |
| 2002/0106931 A1 | 8/2002 | Hsien-Te |
| 2002/0196639 A1 * | 12/2002 | Weidel .......................... 362/521 |
| 2006/0083002 A1 * | 4/2006 | Koike et al. .................. 362/326 |
| 2010/0177526 A1 * | 7/2010 | Futami .......................... 362/519 |
| 2012/0262936 A1 * | 10/2012 | Sakashita ..................... 362/518 |

* cited by examiner

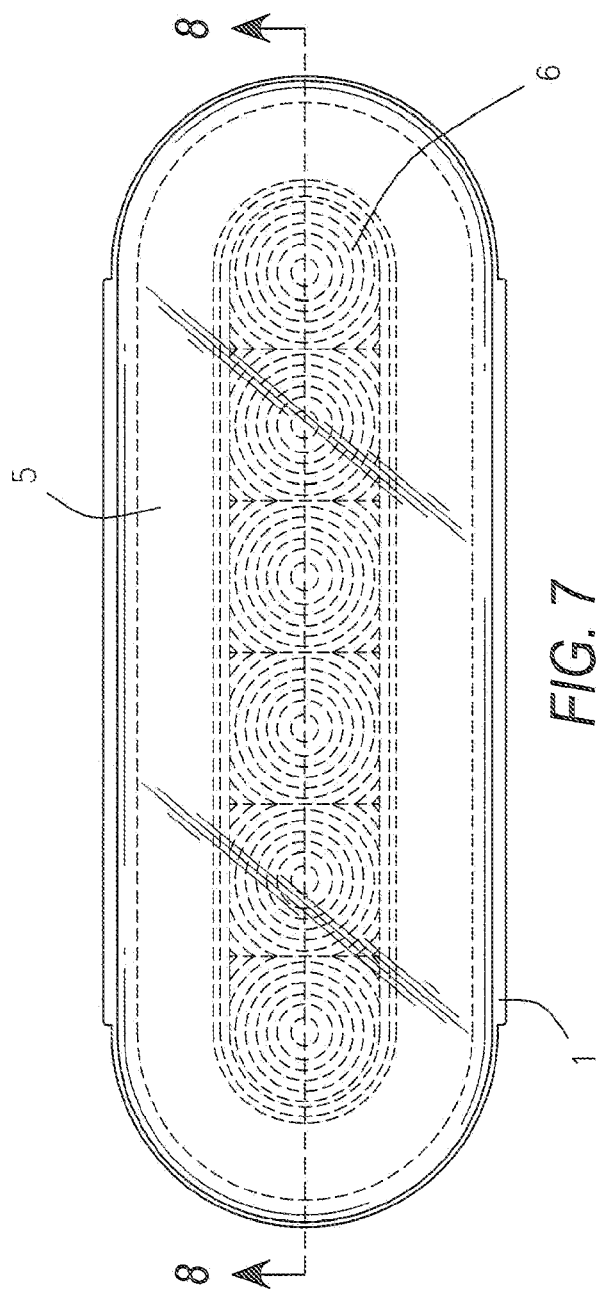
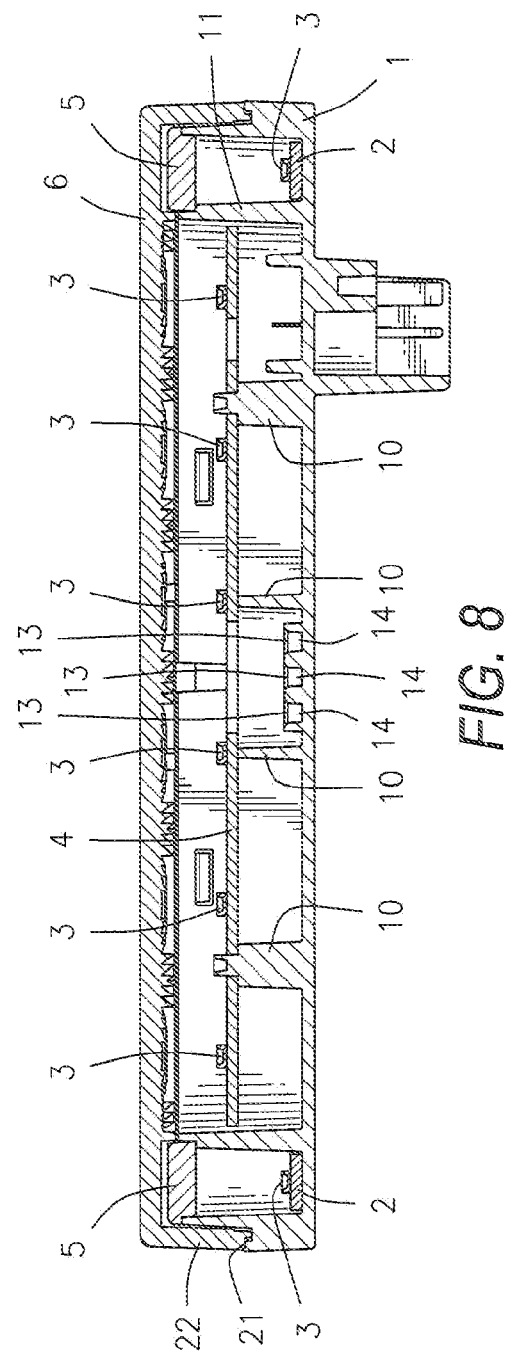
FIG. 7
FIG. 8

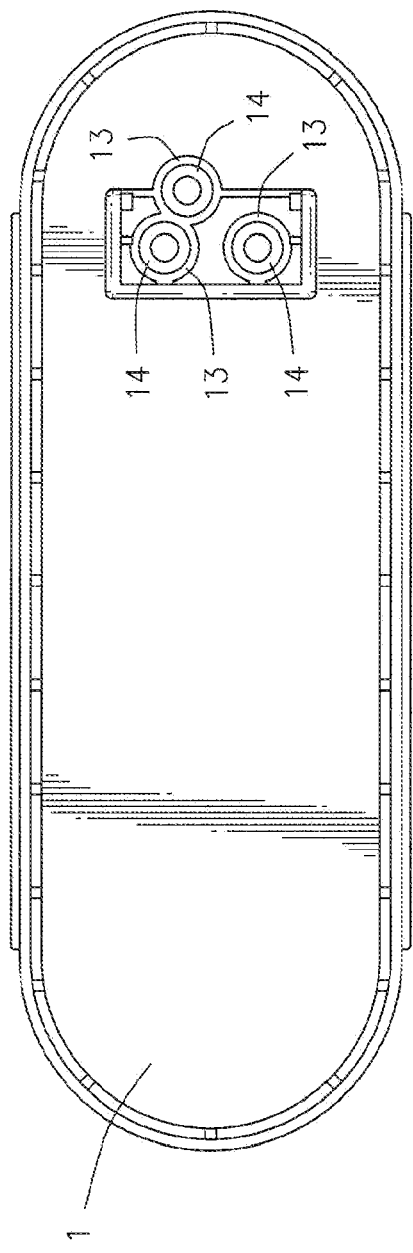
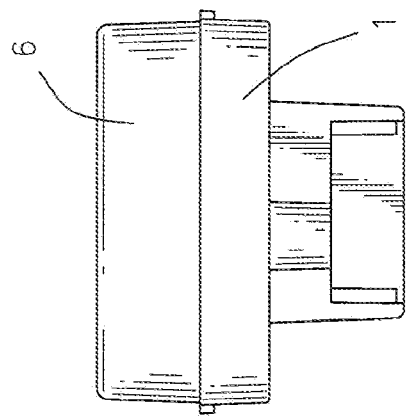
FIG. 9
FIG. 10

LED VEHICLE LIGHT

CROSS REFERENCE

This application is a continuation in part of U.S. Design application Ser. No. 29/434,355 filed Oct. 12, 2012.

BACKGROUND OF THE INVENTION

1. Field of the Invention

This invention relates generally to an LED vehicle light, and more particularly, but not by way of limitation, to an LED vehicle light assembly that provides a ring of diffused light surrounding an area of focused light where the diffused light and the focused light indicate different functions.

2. Description of the Related Art

Vehicle taillights typically serve multiple functions: a taillight function, providing continuous illumination; a stop function, providing illumination while the vehicle's brake is engaged; and a turn light function, providing intermittent illumination while the vehicle's turn signal is engaged. Thus, it is important for a taillight assembly to provide sufficient differentiation among the various functions, particularly between the taillight function and the stop function.

Light emitting diodes (LEDs) are becoming commonplace in vehicle headlights and taillights. One drawback to LEDs is that they produce hot spots in the light display. A diffuser lens may be used to reduce such hot spots.

Based on the foregoing, it is desirable to provide an LED vehicle light assembly that provides distinct illumination for different functions.

It is further desirable to provide an LED vehicle light assembly that provides a ring of diffuse light for the taillight function surrounding a circle of non-diffuse light for the stop and turn functions.

SUMMARY OF THE INVENTION

In general, in a first aspect, the invention relates to a vehicle light assembly comprising: a base with a front and a back, where the base has a first recess surrounding a second recess; an outer array of lights sized to fit within the first recess at a first level; an inner array of lights sized to fit within the second recess at a second level, where the second level is closer to the front of the base than the first level; a diffuser lens located at the front of the base, where the diffuser lens is sized and shaped to cover the outer array of lights but not the inner array of lights; and a cover lens located at the front of the base covering the diffuser lens, the outer array of lights, and the inner array of lights.

The lights on the outer array of lights and the lights on the inner array of lights may be light emitting diodes. The diffuser lens may be made of a first material and the cover lens may be made of a second material, where the first material diffuses light more than the second material. The base, the second recess, the inner array of lights, and the cover lens may be circular and the first recess, the outer array of lights, and the diffuser lens may be ring-shaped. Alternately, the base, the second recess, the inner array of lights, and the cover lens may be oblong and the first recess, the outer array of lights, and the diffuser lens may be shaped like an oblong ring.

The vehicle light assembly may further comprise one or more posts within the first recess such that the outer array of lights may rest against the posts to maintain position at the first level. The outer array of lights may be attached to the one or more posts within the first recess via one or more attachment devices. Likewise, the vehicle light assembly may further comprise one or more posts within the second recess such that the inner array of lights may rest against the posts to maintain position at the second level. The inner array of lights may be attached to the one or more posts within the second recess via one or more attachment devices.

The vehicle light assembly may further comprise one or more electrical connectors in the back of the base, connected to the outer array of lights and the inner array of lights. The outer array of lights may be connected to a vehicle such that the outer array of lights is constantly illuminated while the vehicle is in operation. The inner array of lights may be connected to a vehicle such that the inner array of lights is illuminated only when a brake of the vehicle or a turn signal of the vehicle is engaged.

BRIEF DESCRIPTION OF THE DRAWINGS

FIG. 7 is a top view of the same;

FIG. 8 is a cross-sectional view of the same;

FIG. 9 is a back view of the same; and

FIG. 10 is a side view of the same.

Figure 1:
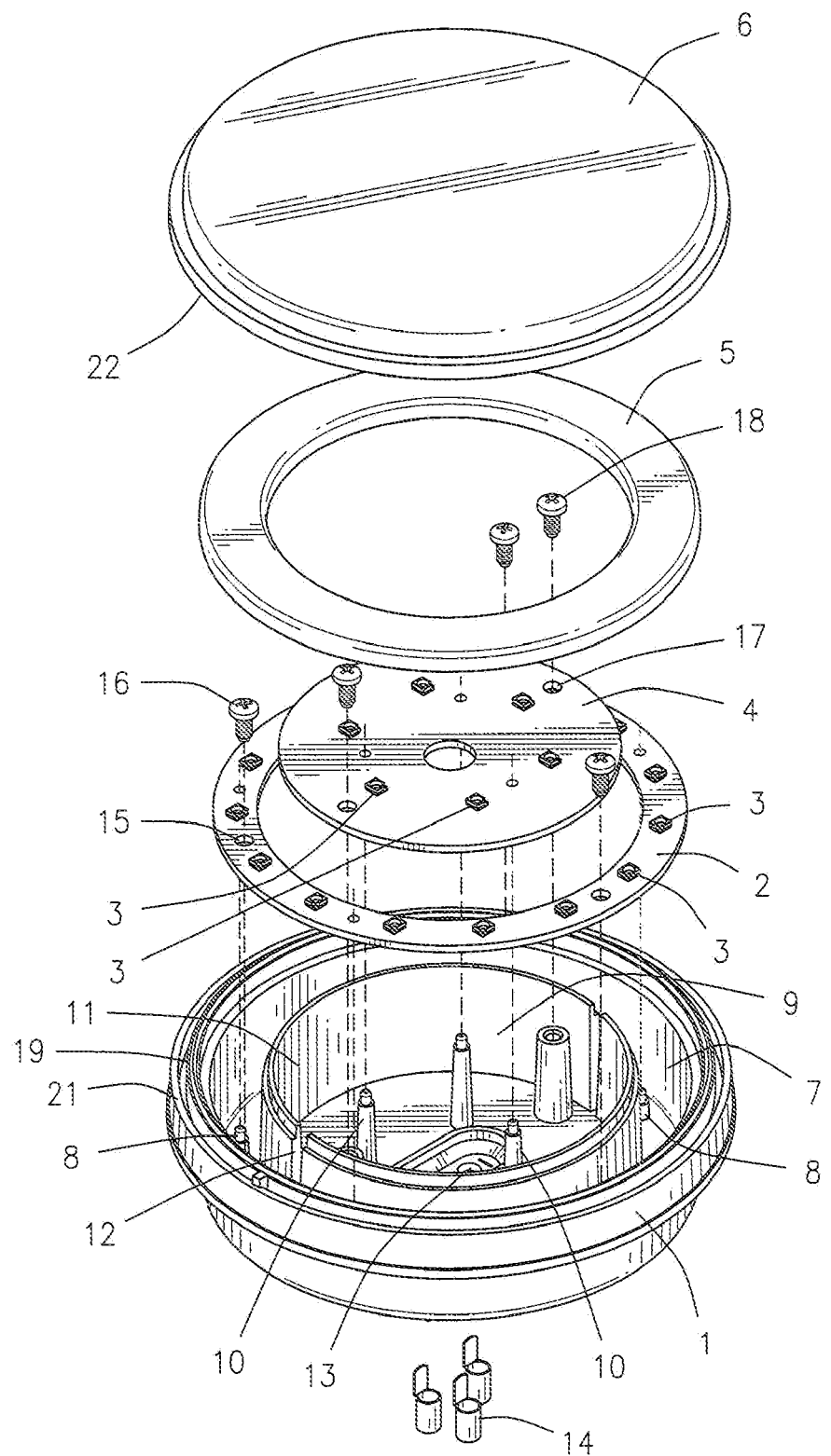
FIG. 1 is an exploded view of the LED vehicle light assembly with a round configuration.
Figure 3:
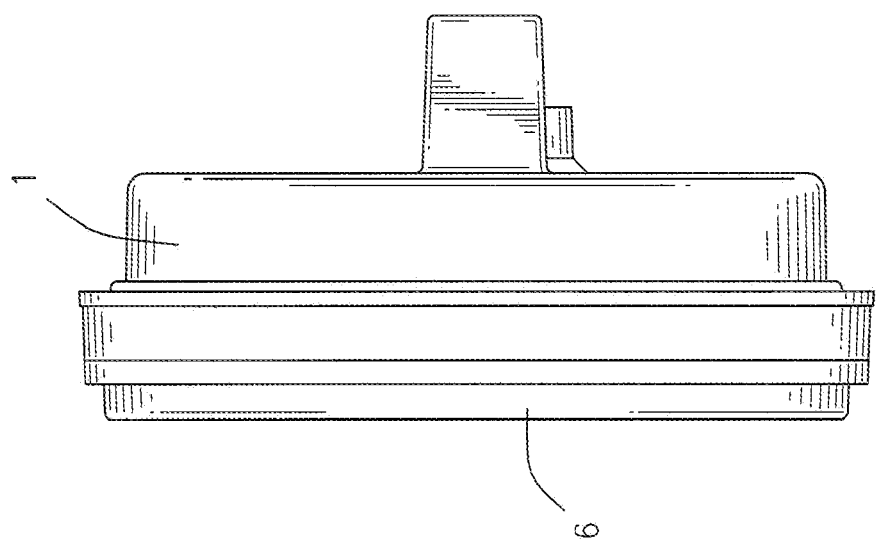
FIG. 3 is a side view of the same.
Figure 2:
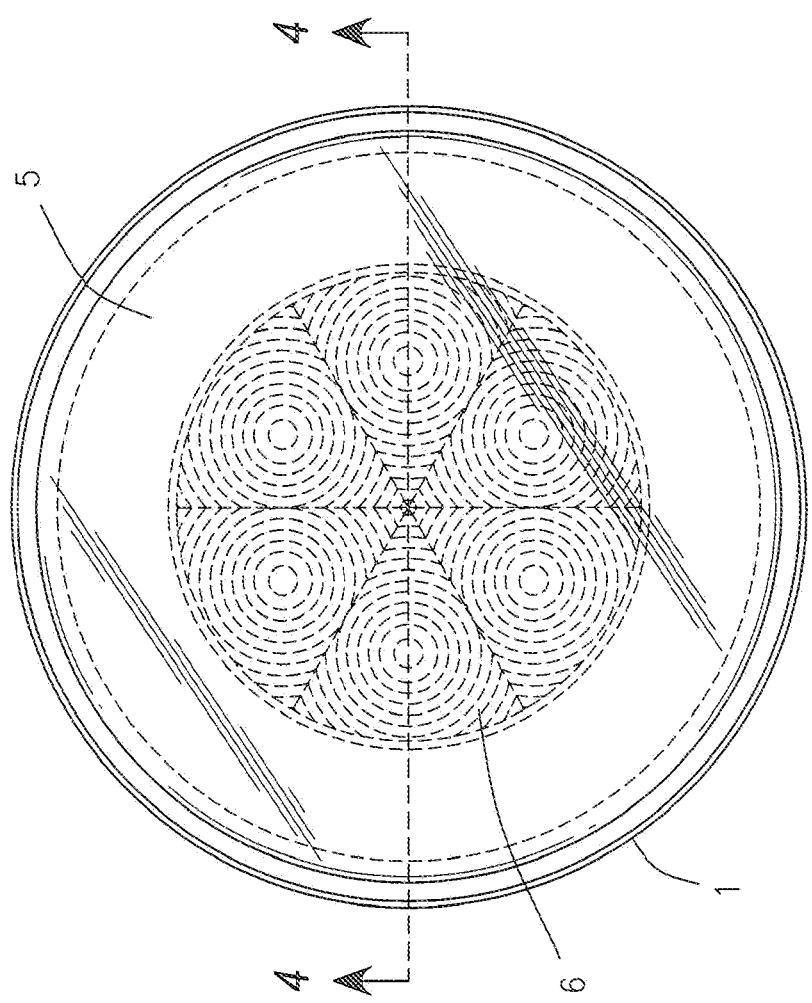
FIG. 2 is a top view of the same.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to an LED vehicle light assembly. The light assembly may be circular, as shown in FIG. 1 through 5, or oval or oblong, as shown in FIGS. 6 through 10, or any other desired shape. The light assembly may comprise: a base 1; an outer array 2 of LEDs 3; an inner array 4 of LEDs 3; a diffuser lens 5; and a cover lens 6.

Figure 4:
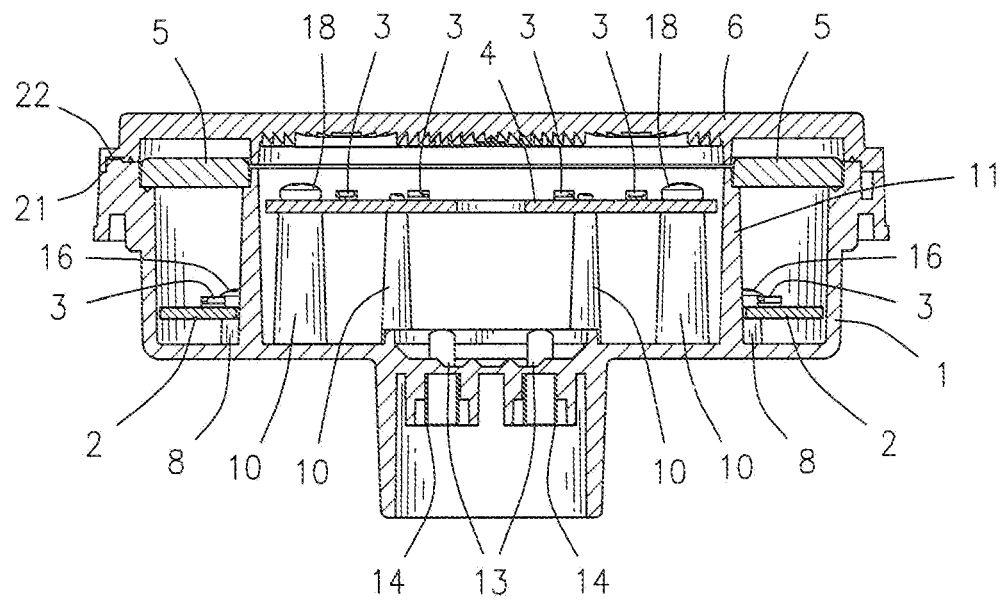
FIG. 4 is a cross-sectional view of the same.
Figure 5:
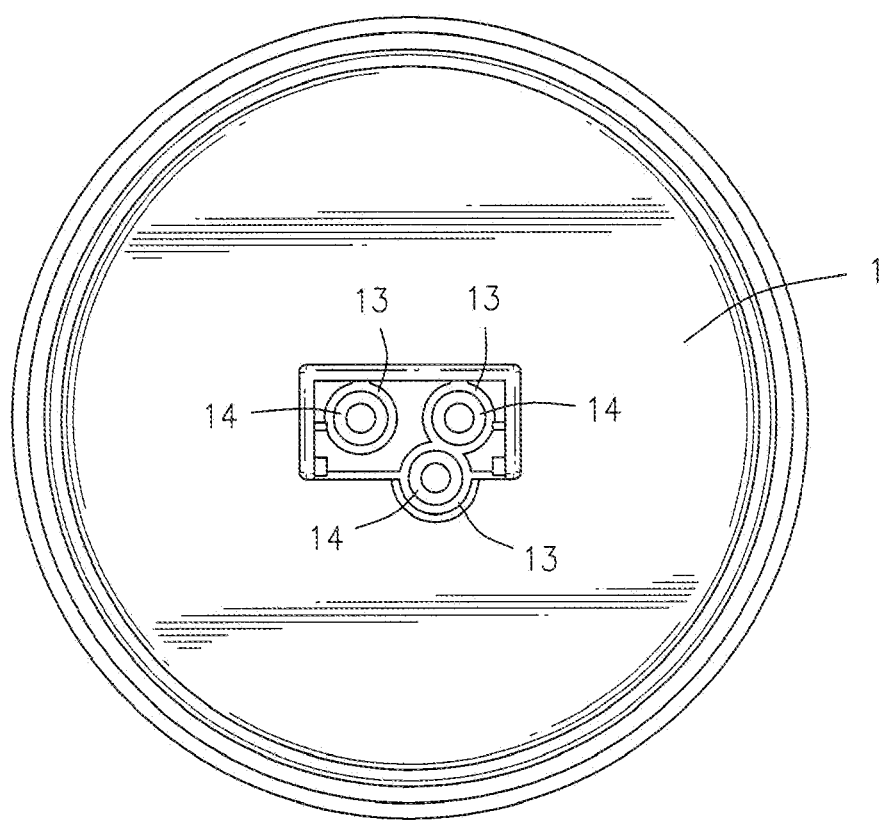
FIG. 5 is a back view of the same.
Figure 6:
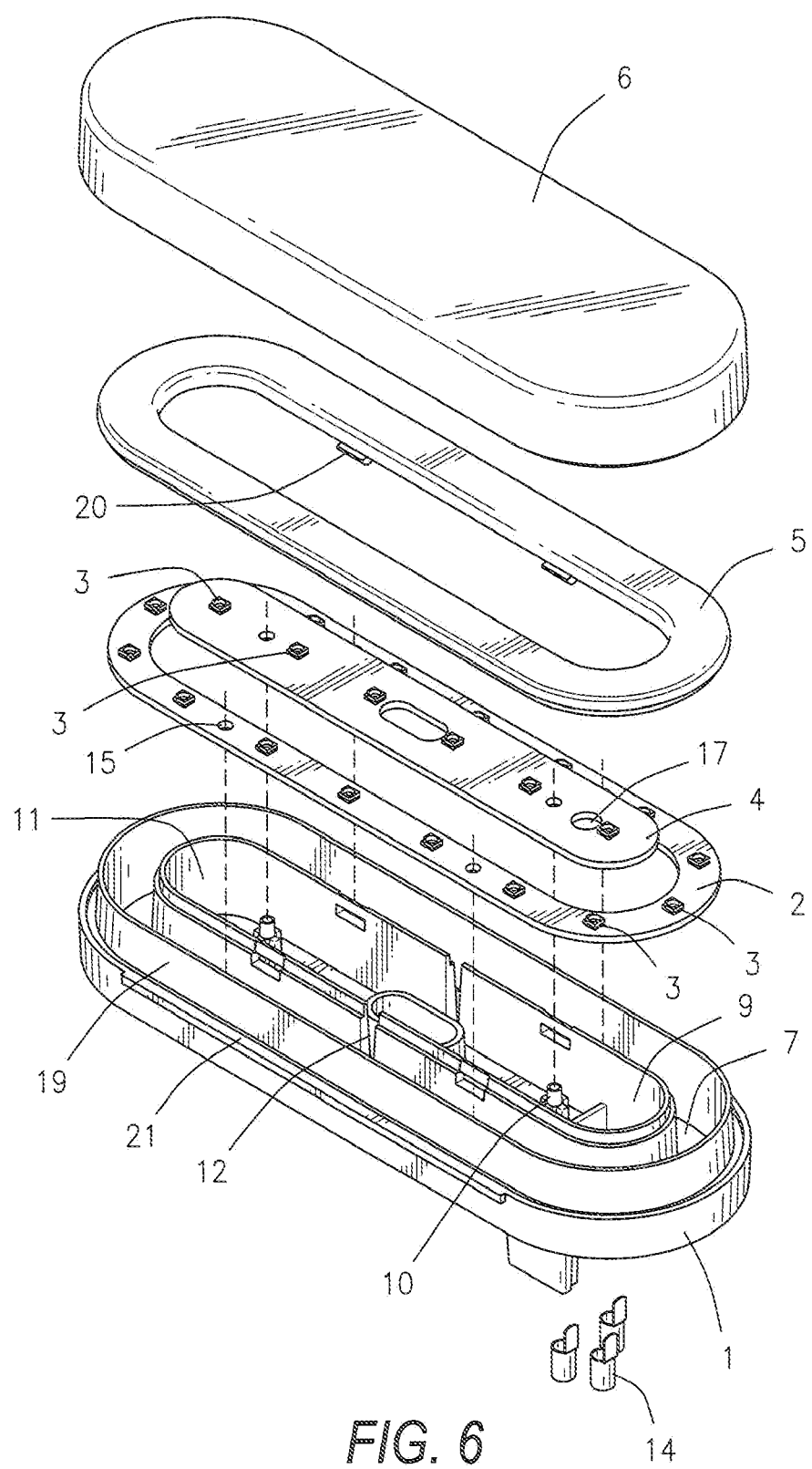
FIG. 6 is an exploded view of the LED vehicle light assembly with an oval configuration.

The base 1 may be circular, as seen in FIG. 1, or oval or oblong, as seen in FIG. 6, or any other desired shape. The base 1 may have an outer recess 7, into which the outer array 2 may fit. The outer recess 7 may have posts 8 for holding the outer array 2 at a desired level, as seen in FIGS. 1 and 4, or the outer array 2 may rest on the bottom of the outer recess 7, as seen in FIG. 8. The desired level may be calculated to be at an optimum distance from the diffuser lens 5, where the optimum distance is determined by taking into consideration the refractive index of the diffuser lens 5 and the spread of light from the LEDs 3 to create a smooth, non-intrusive ring of light.

The base 1 may also have an inner recess 9, into which the inner array 4 may fit. The inner recess 9 may have posts 10 for holding the inner array 4 at a desired level. The posts 10 may be taller than the posts 8, if posts 8 are included in the outer recess 7, such that the inner array 4 is held at a higher level than the outer array 2. The base 1 may have a wall 11 between the outer recess 7 and the inner recess 9. The wall 11 may have at least one gap 12 to allow wiring (not shown) to pass from the outer array 2 into the inner recess 9. The base 1 may have at least one opening 13, each housing an electrical connector 14 to which the wiring from the outer array 2 and/or the inner array 4 may connect. There may be a total of three electrical connectors 14: one for ground, one for tail light functions (via the outer array 2), and one for stop and turn light functions (via the inner array 4).

The outer array 2 may form a circular ring, as shown in FIG. 1, or an oval or oblong ring, as shown in FIG. 6, or any other desired ring shape. The outer array 2 may have a plurality of LEDs 3 spaced thereon. The outer array 2 may fit within the outer recess 7 of the base 1, either on top of the posts 8 or on the on the bottom of the outer recess 7. The outer array 2 may have holes 15 aligned with the posts 8, such that a screw 16 may extend through a hole 15 and secure to a post 8, thus securing the outer array 2 in place within the outer recess 7. One or more screws 16 may be utilized, or no screws 16 may be utilized, as desired.

The inner array 4 may form a circle, as shown in FIG. 1, or an oval or oblong shape, as shown in FIG. 6, or any other desired shape. The inner array 4 may have one or more LEDs 3 spaced thereon. The inner array 4 may be generally sized and shaped such that it fits within the opening in the outer array 2. The inner array 4 may fit within the inner recess 9 of the base atop the posts 10. The inner array 4 may be generally located at a higher level than the outer array 2. The inner array 4 may have holes 17 aligned with the posts 10, such that a screw 18 may extend through a hole 17 and secure to a post 10, thus securing the inner array 4 in place within the inner recess 9. One or more screws 18 may be utilized, or no screws 16 may be utilized, as desired.

The diffuser lens 5 may be form a circular ring, as shown in FIG. 1, or an oval or oblong ring, as shown in FIG. 6, or any other desired ring shape. The diffuser lens 5 may be sufficiently sized to fully cover the outer array 2, but not extend over the inner array 4. The diffuser lens 5 may cover the outer recess 7 and rest upon at least a portion of the wall 11 and at least a portion of the outside wall 19 of the base 1. The diffuser lens 5 may attach to the wall 11 of the base 1 via tabs 20, as shown in FIG. 6. The diffuser lens 5 may be made of a material that diffuses more light than that of the cover lens 6.

The cover lens 6 may be circular, as shown in FIG. 1, or oval or oblong, as shown in FIG. 6, or any other desired shape. The cover lens 6 may cover the entire top of the LED vehicle light assembly. Thus, the cover lens 6 may cover both the outer array 2 and the inner array 4. The cover lens 6 may rest upon at least a portion of the outside wall 19 of the base. The outside wall 19 may have an offset portion 21, and the cover lens 6 may have a downward extending portion 22 that fits within the offset portion 21 to hold the cover lens 6 in place relative to the base 1. The underside of the cover lens 6 may be textured, as shown in FIGS. 2, 4, 7, and 8. Specifically, the cover lens 6 may be textured in the area covering the inner array 4.

During use, the outer array 2 may provide the taillight function, with the LEDs 3 thereon remaining illuminated at all times when the vehicle lights are engaged. The inner array 4 may provide stop and turn light functions, with the LEDs 3 thereon becoming and remaining illuminated when the vehicle's break is engaged and intermittently illuminating when the vehicle's turn signal is engaged. Additionally, the light output of the outer array 2 may increase when the vehicle's break is engaged and/or when the vehicle's turn signal is engaged.

The presence of the diffuser lens 5 over the outer array 2, but not the inner array 3, coupled with the increased distance between the outer array 2 and the cover lens 6 compared to the distance between the inner array 4 and the cover lens 6, may result in the LEDs 3 of the outer array 2 producing a more diffused light compared to the light produced by the LEDs 3 of the inner array 4. This may reduce hot spots in the light display.

Whereas, the devices and methods have been described in relation to the drawings and claims, it should be understood that other and further modifications, apart from those shown or suggested herein, may be made within the spirit and scope of this invention.

What is claimed is:

1. A vehicle light assembly comprising:
   a base with a front and a back, where the base has a first recess surrounding a second recess;
   an outer array of lights sized to fit within the first recess at a first level;
   an inner array of lights sized to fit within the second recess at a second level, where the second level is closer to the front of the base than the first level;
   a diffuser lens located at the front of the base, where the diffuser lens is sized and shaped to cover the outer array of lights but not the inner array of lights; and
   a cover lens located at the front of the base covering the diffuser lens, the outer array of lights, and the inner array of lights.

2. The vehicle light assembly of claim 1 where lights on the outer array of lights and the lights on the inner array of lights are light emitting diodes.

3. The vehicle light assembly of claim 1 where the base, the second recess, the inner array of lights, and the cover lens are circular and where the first recess, the outer array of lights, and the diffuser lens are ring-shaped.

4. The vehicle light assembly of claim 1 where the base, the second recess, the inner array of lights, and the cover lens are oblong and where the first recess, the outer array of lights, and the diffuser lens are shaped like an oblong ring.

5. The vehicle light assembly of claim 1 further comprising one or more posts within the first recess such that the outer array of lights may rest against the posts to maintain position at the first level.

6. The vehicle light assembly of claim 5 further comprising one or more attachment devices attaching the outer array of lights to the one or more posts within the first recess.

7. The vehicle light assembly of claim 1 where the first level is located at an optimum distance from the diffuser lens, where the diffuser lens has a refractive index and the outer array of lights have a spread of light and where the optimum distance is determined by taking into consideration the refractive index of the diffuser lens and the spread of light from the outer array of lights to create a smooth, non-intrusive ring of light.

8. The vehicle light assembly of claim 1 further comprising one or more posts within the second recess such that the inner array of lights may rest against the posts to maintain position at the second level.

9. The vehicle light assembly of claim 8 further comprising one or more attachment devices attaching the inner array of lights to the one or more posts within the second recess.

10. The vehicle light assembly of claim 1 further comprising one or more electrical connectors in the back of the base and connected to the outer array of lights and the inner array of lights.

11. The vehicle light assembly of claim 1 where the diffuser lens is made of a first material and where the cover lens is made of a second material, where the first material diffuses light more than the second material.

12. The vehicle light assembly of claim 1 where the outer array of lights is connected to a vehicle such that the outer array of lights is constantly illuminated while the vehicle is in operation.

13. The vehicle light assembly of claim 12 where the outer array of lights is connected to the vehicle such that the outer array of lights increases in light output when a brake of the vehicle or a turn signal of the vehicle is engaged.

14. The vehicle light assembly of claim 1 where the inner array of lights is connected to a vehicle such that the inner array of lights is illuminated only when a brake of the vehicle or a turn signal of the vehicle is engaged.

\* \* \* \* \*